Figure 1:
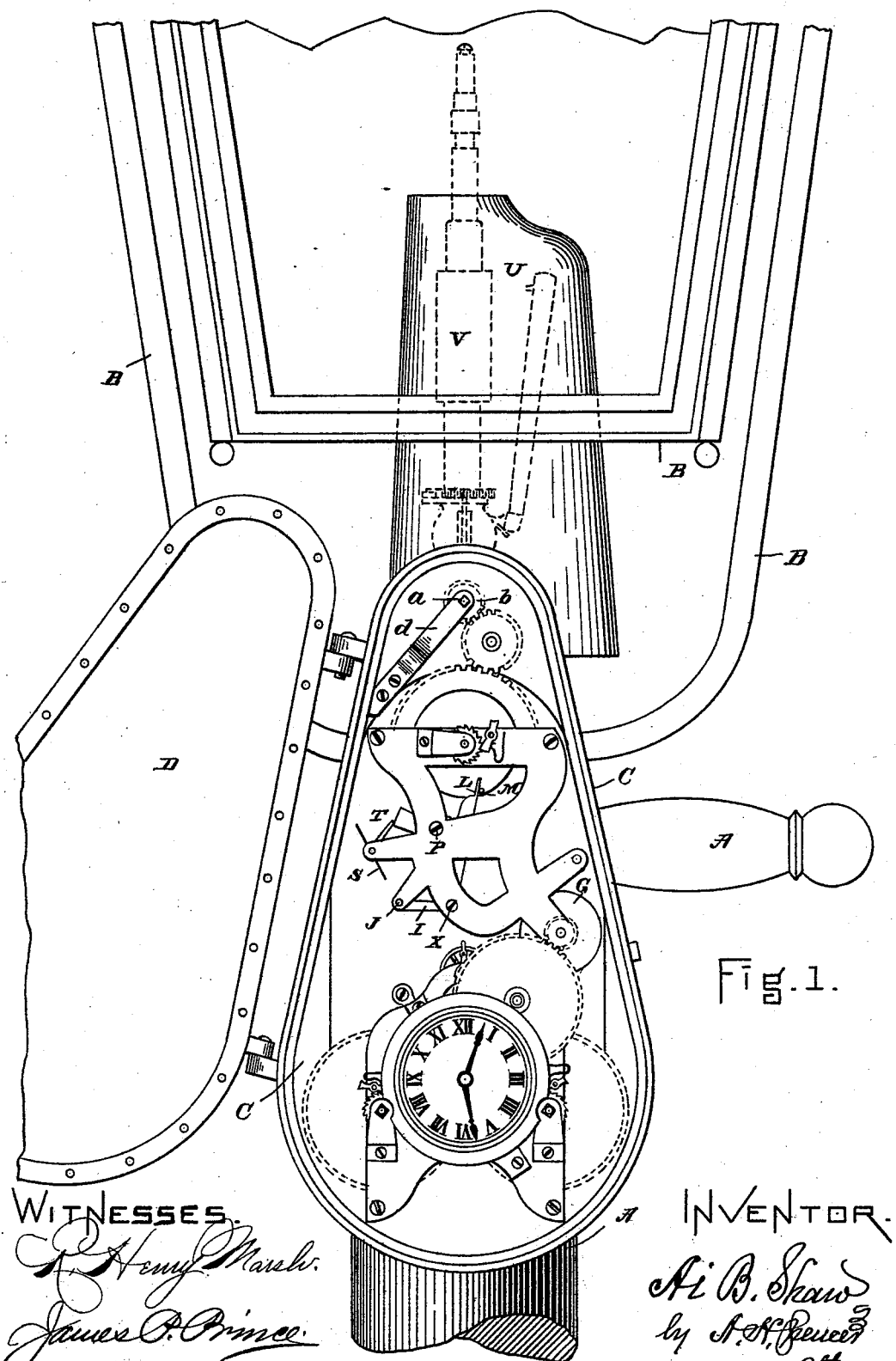

(No Model.)  3 Sheets—Sheet 1.

A. B. SHAW.
TIME GAS LIGHTING AND EXTINGUISHING APPARATUS.

No. 528,697. Patented Nov. 6, 1894.

Witnesses

Inventor (No Model.)   3 Sheets—Sheet 2.
A. B. SHAW.
TIME GAS LIGHTING AND EXTINGUISHING APPARATUS.
No. 528,697.   Patented Nov. 6, 1894.
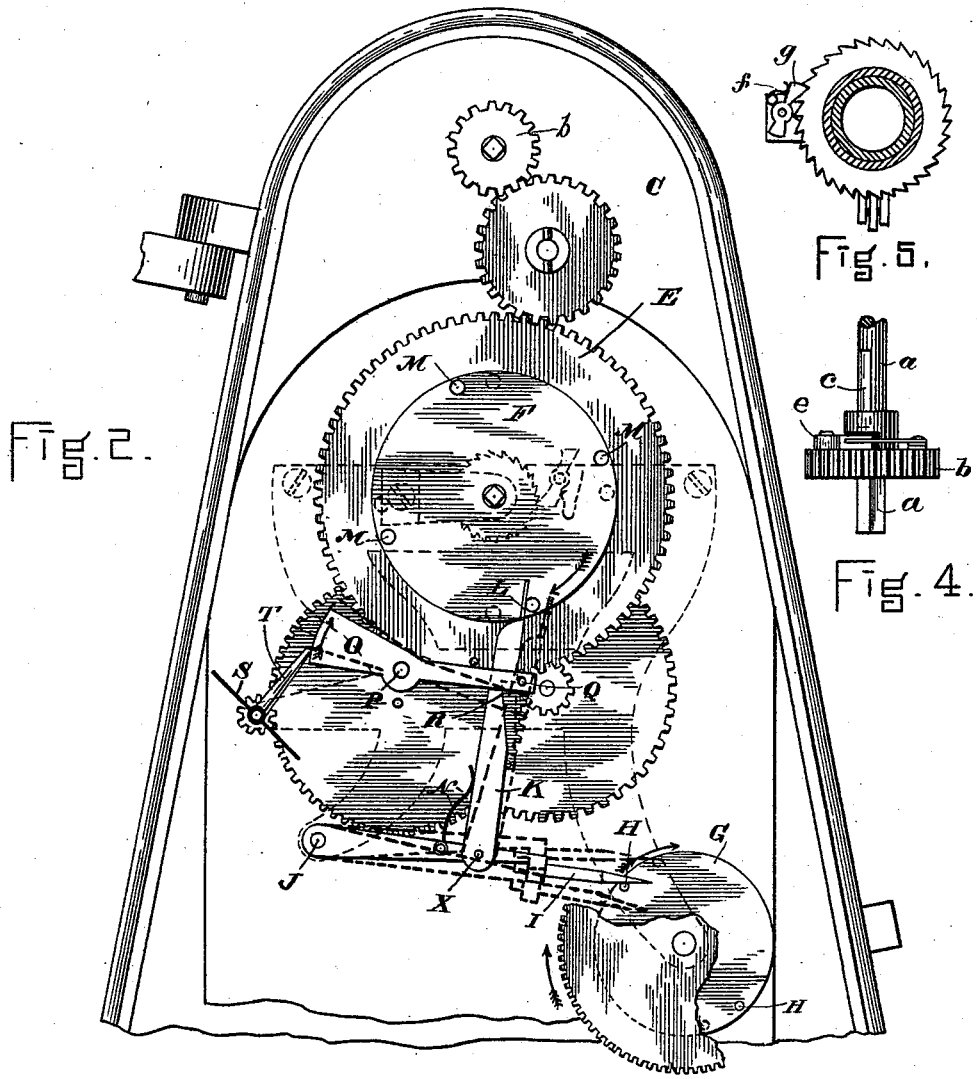
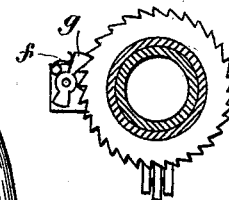
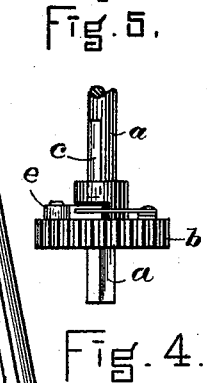
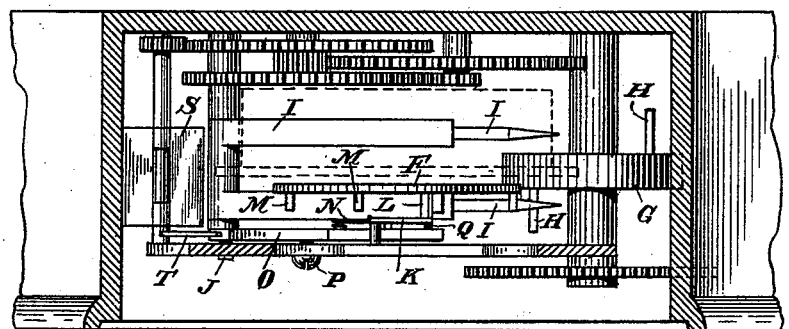

(No Model.) 3 Sheets—Sheet 3.
A. B. SHAW.
TIME GAS LIGHTING AND EXTINGUISHING APPARATUS.
No. 528,697. Patented Nov. 6, 1894.

WITNESSES
Irving H. Fay.
Samuel P. Thrasher.

INVENTOR
A. B. Shaw
by A. H. Reeves
ATT'Y

UNITED STATES PATENT OFFICE.

AI B. SHAW, OF MEDFORD, MASSACHUSETTS, ASSIGNOR TO THE NEW ENGLAND AUTOMATIC GAS LIGHTING COMPANY, OF PORTLAND, MAINE.

TIME GAS LIGHTING AND EXTINGUISHING APPARATUS.

SPECIFICATION forming part of Letters Patent No. 528,697, dated November 6, 1894.

Application filed March 2, 1891. Serial No. 383,446. (No model.)

*To all whom it may concern:*

Be it known that I, AI B. SHAW, of Medford, in the county of Middlesex and State of Massachusetts, have invented certain new and useful Improvements in Automatic Gas Lighting and Extinguishing Apparatus, of which the following, taken in connection with the accompanying drawings, is a specification.

This invention relates to the automatic lighting and extinguishing of gas lamps, and is in the nature of an improvement upon the apparatus set forth in the joint patent of N. H. Shaw and A. B. Shaw, dated June 18, 1889, No. 405,435. In that invention, as in this, a time-mechanism was employed to automatically turn on the gas at a predetermined time and light it by a spark produced by a hammer stroke upon a minute charge of fulminate contained in one of a series of pits formed in the periphery of a slowly-revolving cylinder. The case for the time-mechanism and releasing devices shown herein, constitutes the subject of an application, Serial No. 383,457, signed by N. H. Shaw and A. B. Shaw, filed simultaneously herewith.

My present invention relates especially to the means of arresting and releasing the driving spring which automatically turns the gas on and off and operates the lighting mechanism.

Another feature is the arrangement of the terminal pinion in the train of gearing which operate the gas-cocks and igniting devices.

The time-mechanism has the usual coiled spring, and has geared to the shaft a cam or crank disk provided with one or more pins which lift and drop the releasing lever and thereby determine the time when the gas shall be let on and turned off. The releasing lever is about horizontal, and is pivoted at one end. Near its middle I pivot to it a nearly vertical hooked lever which engages at the top with pins successively projecting from the side of the spring drum. This vertical lever has a notch in its edge to engage a projecting pin at the end of another lever centrally pivoted, the opposite end of which is weighted and stands in the plane of an arm projecting from the fan shaft, and prevents the fan from revolving until the releasing lever and the notched vertical lever pivoted thereto is raised and allowed to drop, by which action the fan is released. The spring drum now revolves until one of its projecting pins strikes the hooked upper end of the vertical lever and swings it forward, thereby releasing from said notch the pin at the end of the centrally-pivoted lever, which again falls and its weighted end engages the arm on the fan shaft and stops its rotation. During the rotation of the fan shaft and the partial rotation of the spring drum, the gas is turned on and lighted by the flash of the fulminate charge, and remains burning until, by the action of the time-mechanism, the releasing lever is again raised and allowed to drop at the proper time, releasing the fan, as stated, and partially rotating the spring drum and turning off the gas. By this construction, the point of resistance is at the fan, the farthest possible distance in the gearing from the spring power, so that the releasing movement shall put the least possible burden of extra duty upon the clock work, in order not to interfere with its accuracy and permanence as a time-mechanism.

Figure 6:
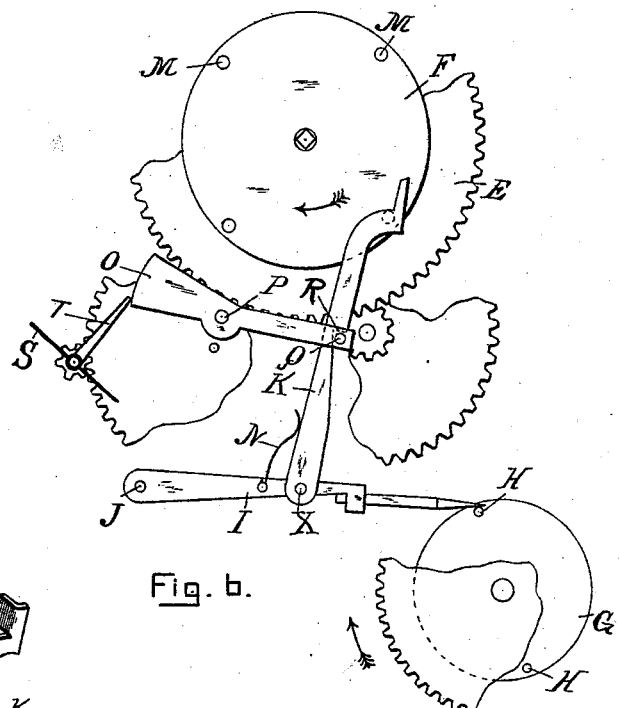
Figure 7:
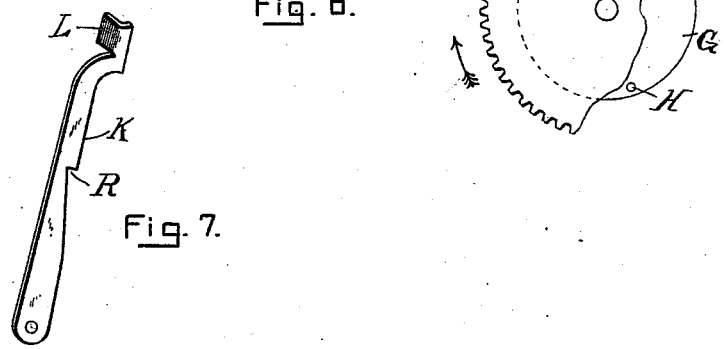
Figure 8:
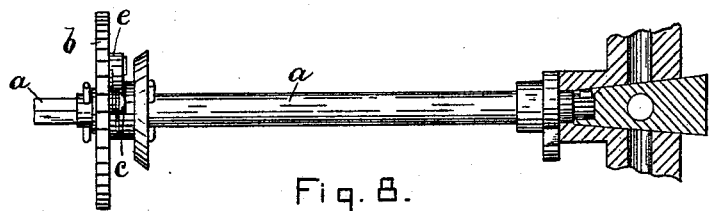

In the drawings, Figure 1 is a representation of my apparatus applied to a gas lamp, the door of the case being open, showing the relation of the releasing devices to the clockwork and the burner. Fig. 2 is an enlarged front view, showing the releasing devices in full and dotted lines for their different positions, and the supporting frame-work lightly dotted in. Fig. 3 is a plan view of what is shown in Fig. 2 with the top of the casing removed. Figs. 4 and 5 are details of the terminal pinion and ratchet. Fig. 6 is a detail skeleton view, showing some of the parts which control and actuate the cock-turning devices. Fig. 7 is a perspective view of the notched and hooked lever, detached. Fig. 8 is a side view of the cock-turning spindle, the cock and gas pipe being in vertical section.

A is the lamp-post, and B the lantern frame.

C is the case for the time-mechanism and releasing devices, and D the door thereof, such case and door constituting a water tight inclosure for said parts, as set forth in the concurrent application referred to.

E is a gear-wheel, connected to or constituting one face of the spring drum F, the spring in which actuates the cock-turning and spark-forming apparatus at the proper times. G represents a disk driven by the clock gearing, to turn in the direction indicated by the arrow, and having pins H H projecting from its faces to engage with the releasing lever I, and gradually lift and then suddenly drop it. See Fig. 2, where its extreme positions are indicated by dotted lines and Fig. 6 where its highest position is shown. This releasing lever has a permanent pivot J at its end farthest from the disk G. The lever I is represented as double in Fig. 3, one of its arms engaging with the pin H, on one side of the disk G, to effect the turning on of the gas, and the other subsequently engaging on the opposite side to turn it off.

Midway of its length the lever I has pivoted to it at X a nearly vertical lever K, the upper end of which has a wing or hook L, standing in the path of the pins M, which project from the front of the spring drum F. This hook L bears against one of said pins M, until gradually lifted high enough to swing over such pin by gravity or by the lateral pressure of a spring N. See Fig. 2. By thus swinging past the pin M, the lever K is brought into position to have a notch in its front edge engage, on the downward movement, with a terminal stud in the third lever.

The third lever O, is pivoted centrally at P, weighted at its outer, larger end, and furnished at its opposite end with a stud or bent portion Q, to enter a notch or hook R, in the edge of the lever K, when such lever is thrown forward by the spring N, and dropped with the lever I from the pin H in the revolving disk. Fig. 7 shows the lip L and the notch R of the second lever K, while Fig. 6 shows the position it occupies just before the pin H of the clock-movement drops the lever I,—the lip L having been lifted over the pin M on the spring drum or disk F, and the free end of the lever K having moved forward under pressure of the spring N. The notch in the lever K then engages the stud Q in the end of the lever O, and carries it downward, thereby lifting the weighted end of said lever O, all as indicated in dotted lines in Fig. 2. This releases the fan S, which had previously been held from rotation by contact of the arm T on the fan shaft with the end of the lever O. When the fan is thus released, the train of gearing is actuated by the coiled spring in the drum F, and the next pin M comes in contact with the upper end of lever K, and moves it forward on its pivot, against the resistance of the spring N. The rotary movement of the gearing turns the gas-cock to let on or shut off the gas, and when letting it on, the hammer U is caused to strike the fulminate deposit on the cylinder V and produce a lighting spark, as in said former patent of N. H. Shaw and A. B. Shaw. The fan is stopped as soon as the lever K swings far enough forward for its notch R to release the stud Q.

I provide for occasional lubrication of the gas-cock without disturbing its relation to the train of gearing. Its shaft $a$ passes through the terminal pinion $b$ and is grooved, as at $c$, Fig. 4, or made angular to fit within said pinion and be rotated by it while having a longitudinal movement through it. The pinion $b$ is held in place by a bracket $d$, or otherwise, so that it remains constantly in mesh with the adjacent gear-wheel while the gas-cock and its shaft $a$ may be withdrawn sufficiently for cleaning or lubrication of the cock, and then replaced. The pinion $b$ carries a spring-pawl $e$ which engages with the notch $c$ in the shaft $a$ or with a ratchet fixed thereon, so as to rotate the shaft in the proper direction by the operation of the train of gearing, and also to permit the shaft to be turned forward when desired, independently of the gearing, for the purpose of operating the fulminate apparatus or otherwise, without disturbing the relation of said apparatus to the time-mechanism.

I claim as my invention—

1. In an automatic gas-lighting and extinguishing apparatus, a rotating cam and a lever mechanism lifted and dropped thereby, in combination with the actuating spring drum having a series of projecting pins successively engaging said mechanism with the terminal or fan-shaft, and thereby alternately arresting and releasing the rotation of the spring drum, substantially as set forth.

2. In an automatic gas lighting and extinguishing apparatus, a rotating cam, a lever alternately lifted and dropped thereby, an upright second lever pivoted at its foot to the first, and a third lever weighted at one end, centrally pivoted, and engaging at its other end with a notch in the edge of the second lever, in combination with a spring drum, having a series of projecting pins successively engaging said second lever, and with the rotating terminal or fan-shaft adapted to be arrested and released by said third lever, substantially as set forth.

3. The described spring-arresting and releasing apparatus, consisting of the levers I, K, O, arranged as stated, in combination with the drum F and its pins M, the disk G and its pins H, the spring N and stop T, and the fan shaft R, geared to the spring drum, substantially as set forth.

4. In an automatic gas-lighting and extinguishing apparatus, a train of gearing, having a terminal pinion $b$, the gas-cock periodically rotated thereby and having its shaft $a$ longitudinally movable through said pinion, and the bracket $d$ adapted to hold the pinion $b$ in mesh during said movement, substantially as and for the purpose set forth.

In testimony whereof I have signed my name to this specification, in the presence of two subscribing witnesses, on this 23d day of April, A. D. 1889.

AI B. SHAW.

Witnesses:
A. H. SPENCER,
R. HENRY MARSH.